(12) United States Patent
Hao et al.

(10) Patent No.: US 7,131,495 B2
(45) Date of Patent: Nov. 7, 2006

(54) METHOD FOR PREPARING A CHLORINE DIOXIDE BLOCK-REMOVING AGENT IN OIL WELLS

(76) Inventors: Zhanyuan Hao, Suite 5, Unit 1, Dormitory of Sanqiaodasha, No. 4 Hanxiguan, Taiyuan City, Shanxi Province, 030002 (CN); Dong Hao, Suite 5, Unit 1, Dormitory of Sanqiaodasha, No. 4 Hanxiguan, Taiyuan City, Shanxi Province, 030002 (CN)

( * ) Notice: Subject to any disclaimer, the term of this patent is extended or adjusted under 35 U.S.C. 154(b) by 300 days.

(21) Appl. No.: 10/705,421

(22) Filed: Nov. 10, 2003

(65) Prior Publication Data

US 2004/0224855 A1 Nov. 11, 2004

(30) Foreign Application Priority Data

Nov. 8, 2002 (CN) ............................. 02 1 46452

(51) Int. Cl.
*E21B 37/00* (2006.01)
*E21B 41/02* (2006.01)
*E21B 43/25* (2006.01)
*E21B 43/27* (2006.01)

(52) U.S. Cl. .............. 166/300; 166/250.01; 166/305.1; 166/307; 166/312; 166/902; 507/260; 507/267; 507/274; 507/276; 507/277; 507/927; 507/929

(58) Field of Classification Search ............ 166/250.1, 166/300, 304, 305.1, 307, 311, 312, 90.1, 166/902; 507/260, 267, 274, 276, 277, 920, 507/927, 929, 939
See application file for complete search history.

(56) References Cited

U.S. PATENT DOCUMENTS

| | | | | |
|---|---|---|---|---|
| 3,543,858 A | * | 12/1970 | Kolaian et al. | 166/303 |
| 4,409,121 A | * | 10/1983 | Latos et al. | 252/389.2 |
| 4,526,693 A | * | 7/1985 | Son et al. | 507/139 |
| 4,823,826 A | * | 4/1989 | Sacco | 137/1 |
| 4,846,981 A | * | 7/1989 | Brost | 507/277 |
| 4,871,022 A | * | 10/1989 | McGlathery | 166/300 |
| 4,892,148 A | * | 1/1990 | Mason | 166/305.1 |
| 4,925,645 A | * | 5/1990 | Mason | 423/477 |
| 4,945,992 A | * | 8/1990 | Sacco | 166/310 |
| 5,031,700 A | * | 7/1991 | McDougall et al. | 166/307 |
| 5,084,210 A | * | 1/1992 | Teeters | 252/392 |
| 5,171,441 A | * | 12/1992 | Mason | 210/206 |
| 6,071,434 A | * | 6/2000 | Davis et al. | 252/389.2 |
| 6,431,279 B1 | * | 8/2002 | Zaid et al. | 166/263 |
| 6,921,001 B1 | * | 7/2005 | Hunt et al. | 222/139 |
| 2003/0203827 A1 | * | 10/2003 | Cooper et al. | 510/247 |

* cited by examiner

*Primary Examiner*—George Suchfield
(74) *Attorney, Agent, or Firm*—Blakely, Sokoloff, Taylor & Zafman; Stephen M. De Klerk

(57) ABSTRACT

A method to synthesize a chlorine dioxide block remover in a well is described. The method includes dissolving a chlorate aqueous solution and some acidic substances in water and to produce a hydrogen ion. The chlorate aqueous solution and acidic substances are quickly injected into the well by an injection pump, so they react with each other and produce chlorine dioxide. The synthesis of the chlorine block remover in the well removes oil layer blocks induced by polymers and microbes, while reducing the risk of explosion caused by leaked chlorine dioxide, and reducing the corrosion of equipment and pipes caused by chlorine dioxide.

12 Claims, 1 Drawing Sheet

METHOD FOR PREPARING A CHLORINE DIOXIDE BLOCK-REMOVING AGENT IN OIL WELLS

FIELD OF THE INVENTION

The present invention relates to a method for preparing a chlorine dioxide block-removing agent in wells.

BACKGROUND OF THE INVENTION

Petroleum production involves complex systematic engineering. The key point of petroleum production engineering is to keep the water well and the oil well unblocked, so that oil is continuously extracted out while water is continuously injected in. Unfortunately, the oil well and the water well are blocked very often. There are four kinds of blocking substances: inorganic salts (such as carbonates, silicates, etc.); biological coenobiums; ferrous sulfide blocker in oil layers produced by steel corrosion induced by the biological coenobiums; and high molecular polymers used in well drilling, well pressing, well repairing, press-fraction and water packing-off in the tertiary oil extraction procedures. These high molecular polymers damage the permeability of the subterranean in different degrees and form blocking.

At present, the acidic solution used in acidification block-removing technology is corrosive to minerals in the subterranean and inorganic blocks in different degrees; this corrosion can release mostly permeability damage induced by inorganic substances, but it is less effective, or not effective to blockings induced by polymers and microorganisms.

According to the disclosures of some literature, chlorine dioxide has already been used to remove blockings in oil fields at the end of the 1980's in the USA and other countries. It has obtained outstanding effects on oil output increase and block-removal. In China, many oil field companies and research institutes investigated block-removal using chlorine dioxide in oil fields in the 1990's. However, due to the danger of explosion induced by the leak of chlorine dioxide, damage to the human body, and corrosion of equipment and pipes in oil fields induced by the strong oxidization of chlorine dioxide, chlorine dioxide has not been applied in real oil fields yet.

OBJECT OF THE INVENTION

The object of the present invention is to overcome the shortcomings in the prior art to provide a method for preparing a chlorine dioxide block-removing agent in oil wells. Due to the strong oxidizability of chlorine dioxide produced in the oil, it can degrade the polymers, such as polyacrylamide, sesbania, guanidine, etc., to lower the viscosity thereof and to improve their flowability, so that the oil flows out easily and quickly kills various microorganisms. Therefore, blockings in oil wells and water wells can be removed.

SUMMARY OF THE INVENTION

The present invention relates to a method for preparing a chlorine dioxide block-removing agent in wells, which comprises:

a. providing a tank 1, adding a chlorate and/or chlorite and water into tank 1, so that they dissolve thoroughly in the tank 1;

b. providing a tank 2, adding an acidic substance, which can be dissolved in water and produce hydrogen ion in an aqueous solution, and water into the tank 2 so that they dissolve thoroughly in the tank 2;

c. providing a high pressure injection pump 3 which is provided with a water-feeding pipe 4 and a water-outgoing pipe 5; the said water-feeding water pipe 4 being directly connected with the tank 1, and connected with the tank 2 through a pressure pump 7 provided on the tank 2;

d. initiating the high pressure injection pump 3 and the pressure pump 7, making the solution in the tank 1 and the solution in the tank 2 entered into the high pressure injection pump 3 via the water-feeding pipe 4 and being pressured in the pump 3, the mixed solution entering into the well 6 via the water-outgoing pipe 5 of high pressure injection pump 3, such that the chlorine dioxide block-removing agent is synthesized in the well by the reaction between the chlorate and/or chlorite and the acidic substances which can be dissolved in water and produce hydrogen ion in the aqueous solution.

According to the method of the present invention, wherein, the concentration of the aqueous solution of said chlorine dioxide block-removing agent synthesized in the well is controlled in the range of about 200 mg/L to 5000 mg/L.

According to the method of the present invention, wherein, the mixing of the chlorate and/or chlorite aqueous solution and acidic substances aqueous solution can be carried out at any position of the water-feeding pipe 4 of the high pressure injection pump 3.

According to the method of the present invention, wherein, the said chlorate is selected from the group consisting of the chlorates of mono-valence and bi-valence metal cations, and the said chlorite is selected from the group consisting of the chlorites of mono-valence and bi-valence metal cations.

According to the method of the present invention, wherein, the chlorate is sodium chlorate and/or potassium chlorate, and the chlorite is sodium chlorite and/or potassium chlorite.

According to the method of the present invention, wherein, the said acidic substance is selected from the group consisting of the monoacids, biatomic acids and ternary acids which can be dissolved in water and can produce hydrogen ion, and the acid inorganic and organic salts which can be dissolved in water and can produce hydrogen ion.

According to the method of the present invention, wherein, the said monoacid is selected from the group consisting of hydrochloric acid, hydrofluoric acid, sulfamic acid, formic acid, lactic acid and acetic acid; the said biatomic acid is selected from the group consisting of oxalic acid and tartaric acid; the said ternary acid is selected from the group consisting of phosphoric acid and citric acid; the said acid salt is selected from the group consisting of acid sulfate, acid phosphate, acid carbonate and acid tartrate.

According to the method of the present invention, wherein, the acid is phosphoric acid and the acid salt is bi-sodium phosphate, sodium phosphate or sodium tartrate.

DETAILED DESCRIPTION OF THE INVENTION

Figure 1:
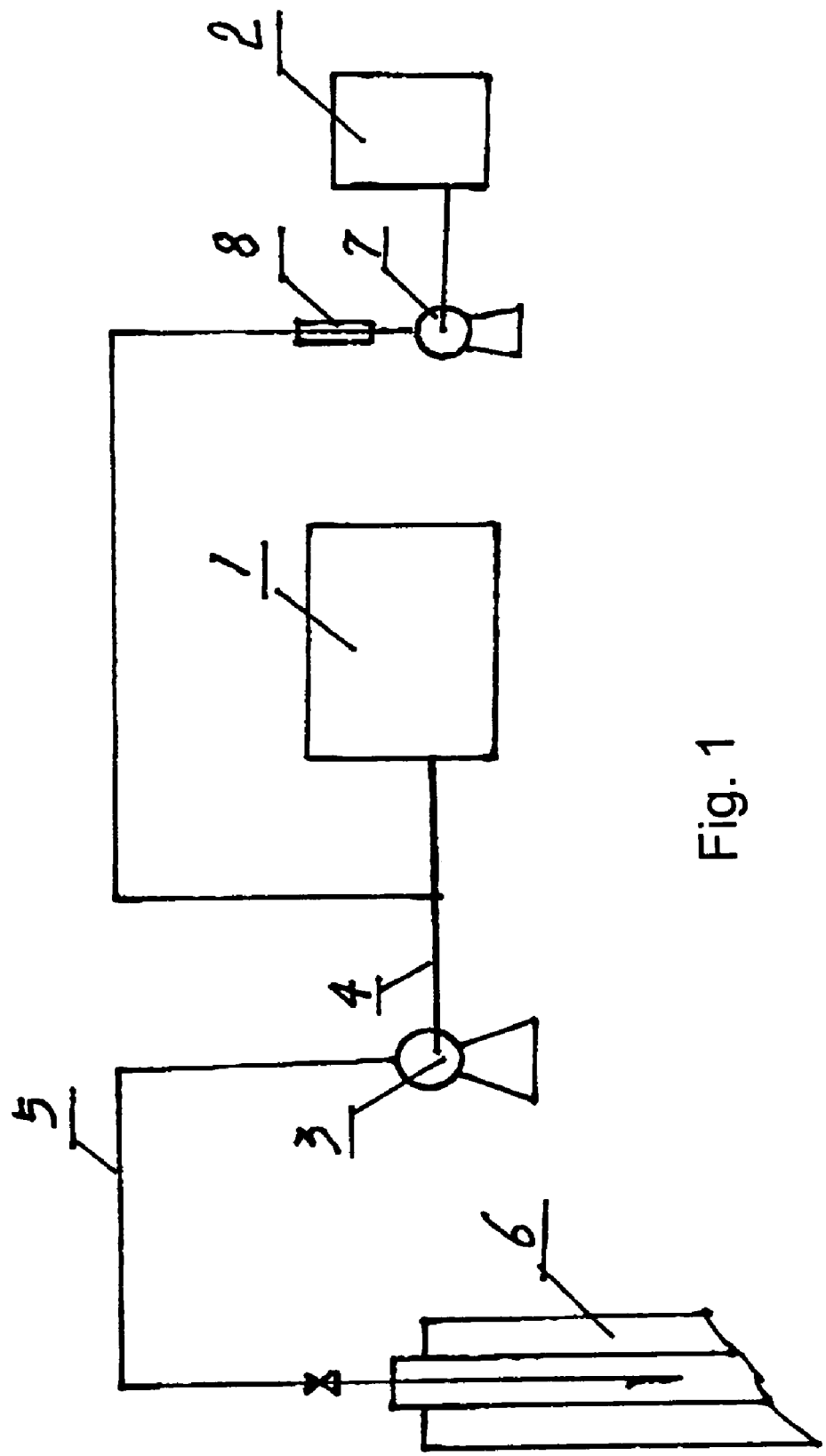
FIG. 1 shows the arrangement of the apparatus used in the method of the present invention, wherein, number 1 represents the tank for main materials; number 2 represents the tank for adjuvant materials; number 3 represents the high pressure injection pump; number 4 represents the water-feeding pipe of the high pressure injection pump; number 5 represents the water-outgoing pipe of the high pressure injection pump; number 6 represents a well; number 7 represents a pressure pump; and number 8 represents an adjuvant flow meter.

The present invention provides a method for preparing chlorine dioxide block-removing agent in oil wells, which comprises:

a. providing a tank 1, adding a chlorate and/or chlorite and water into the tank 1, so that they dissolve thoroughly in the tank 1;

b. providing a tank 2, adding an acidic substance, which can be dissolved in water and produce hydrogen ion in an aqueous solution, and water into the tank 2, so that they dissolve thouroughly in the tank 2;

c. providing a high pressure injection pump 3 which is provided with a water-feeding pipe 4 and a water-outgoing pipe 5; the said water-feeding water pipe 4 being directly connected with the tank 1, and connected with the tank 2 through a pressure pump 7 provided on the tank 2;

d. initiating the high pressure injection pump 3 and the pressure pump 7, making the solution in the tank 1 and the solution in the tank 2 entered into the high pressure injection pump 3 via the water-feeding pipe 4 and being pressured in the pump 3, the mixed solution entering the oil well 6 via the water-outgoing pipe 5 of high pressure injection pump 3, such that the chlorine dioxide block-removing agent is synthesized in the well by the reaction between the chlorate and/or chlorite and the acidic substance which can be dissolved in water and produce hydrogen ion in the aqueous solution.

According to the method of the present invention, wherein, the concentration of the aqueous solution of said chlorine dioxide block-removing agent synthesized in the well is controlled in the range of about 200 mg/L to 5000 mg/L.

According to the method of the present invention, wherein, the mixing of the chlorate and/or chlorite aqueous solution and acidic substance aqueous solution can be carried out at any position of the water-feeding pipe of the high pressure injection pump.

According to the method of the present invention, wherein, the said chlorate is selected from the group consisting of the chlorates of mono-valence and bi-valence metal cations, preferably sodium chlorate and potassium chlorate, and most preferably sodium chlorate. The said chlorite is selected from the group consisting of the chlorites of mono-valence and bi-valence metal cations, preferably sodium chlorite and potassium chlorite, and most preferably sodium chlorite.

In the method of the present invention, the hydrogen ion ($H^+$) in the solution is a necessary component for the formation of chlorine dioxide. According to the method of the present invention, wherein, the said acidic substance is selected from the group consisting of the monoacids, biatomic acids and ternary acids which can be dissolved in water and can produce hydrogen ion, and the acid inorganic and organic salts which can be dissolved in water and can produce hydrogen ion.

According to the method of the present invention, wherein, the said monoacid is selected from the group consisting of hydrocholoric acid, hydrofluoric acid, sulfamic acid, formic acid, lactic acid and acetic acid; the said biatomic acid is selected from the group consisting of oxalic acid and tartaric acid; the said ternary acid is selected from the group consisting of phosphoric acid and citric acid; the said acid salt is selected from the group consisting of sulfate, acid phosphate, acid carbonate and acid tartrate.

According to the method of the present invention, wherein, the acid is preferably phosphoric acid or acid salts of phosphate, such as bi-sodium phosphate, or sodium phosphate.

According to the method of the present invention, wherein, an expansion-preventing agent is further added into the solution of the acidic substances to prevent the expansion of clay, such as potassium chloride or ammonia chloride.

According to the method of the present invention, a corrosion inhibitor is further added into the solution of the acidic substances to prevent the corrosion of the pipes and the tanks, such as tri-sodium phosphate, sodium hydroxide or sodium tripolyphosphate.

According to the method of the present invention, a surfactant, preferably a non-ion surfactant, and sodium bicarbonate can be added.

According to the present invention, chlorate and acidic substances react with each other in wells, then produce and release chlorine dioxide, so as to remove blocking. When sodium chlorite is used as the chlorite and phosphoric acid or mono-sodium phosphate is used as the acidic substance, the reaction equation is as follows correspondingly.

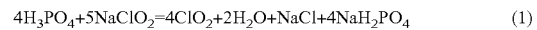

$$4H_3PO_4 + 5NaClO_2 = 4ClO_2 + 2H_2O + NaCl + 4NaH_2PO_4 \quad (1)$$

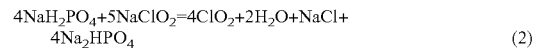

$$4NaH_2PO_4 + 5NaClO_2 = 4ClO_2 + 2H_2O + NaCl + 4Na_2HPO_4 \quad (2)$$

The equation of the formation of chlorine dioxide from the reaction of other chlorates or chlorites with other acidic substances is a common knowledge to the person skilled in the art, and it is not necessary to describe one by one.

According to the present invention, the chlorate and/or chlorite and acidic substances which can be dissolved in water and produce hydrogen ion in water react with each other in wells, then produce chlorine dioxide step by step. Due to the strong oxidizing property of chlorine dioxide, it can degrade various high molecular polymers, such as polyacrylamide, sesbania and guanidine etc., and lower the viscosity thereof and improve flowability. In the meantime, chlorine dioxide can quickly kill various microorganisms, such as sulfate-reduction bacteria, metatrophic bacteria and iron bacteria etc. Therefore, the objects of removing blocks in oil wells and water wells can be realized.

According to the method of the present invention, the quantity of chlorate and/or chlorite can be calculated based on the quantity of chlorine dioxide needed in a well, and the above reaction equations (1) and (2).

The quantity of the acidic substances which can be dissolved in water and produce hydrogen ion can be calculated based on the quantity of sodium chlorite, and the above reaction equations (1) and (2).

The concentration of chlorine dioxide produced in a well is decided by the analysis of a working oil field based on the types of polymers and the degree of microorganism blocks.

When operating an oil well, the total quantity of the block-removing agent (chlorine dioxide) to be injected can be calculated based on the following equation:

$$W_{total\ quantity} = \pi R^2 \cdot r \cdot H$$

Wherein,

W=the total quantity of the block-removing agent solution.

R=the radius of block-removing.

H=the thickness of the oil layer.

r=the porosity of the oil layer.

According to the method of the present invention, the concentration of chlorine dioxide formed in a well is controlled in the range of 200 mg/L and 5000 mg/L. The effect of block-removing would not be good if the concentration of chlorine dioxide is too low, and the safety of the working field can not be guaranteed if the concentration of chlorine dioxide is too high.

The present invention will be further described by the following example accompanying the drawing.

According to the present invention, the procedures for the preparation of chlorine dioxide block-removing agent in a well and for the realization of block-removing comprise:

a. adding the main materials into the tank 1, and adding water into the tank 1 to make the main materials dissolve therein thoroughly;

b. adding the adjuvant materials (mainly the acidic substances which can be dissolved in water and produce hydrogen ion in an aqueous solution, and other adjuvant materials, if necessary, such as an expansion-preventing agent, such as potassium chloride or ammonium chloride; a corrosion inhibitor, such as tri-sodium phosphate, sodium hydroxide or sodium tripolyphosphate; and a surfactant and sodium bicarbonate etc.) and water into the tank 2 so that they dissolve thoroughly in the tank 2;

c. connecting the tank 1 and the tank 2 with the water-feeding pipe 4 of the high pressure injection pump 3;

d. connecting the water-outgoing pipe 5 with the well 6;

e. initiating the high pressure injection pump 3 and the pressure pump 7 at the same time, the solution of the tank 1 and the solution in the tank 2 whose quantity is controlled by the flow meter 8 being mixed and entered into the water-feeding pipe 4 of the high pressure injection pump 3, the mixture being pressured via the high pressure injection pump 3 and injected into the well 6 via the water-outgoing pipe 5 of the high pressure injection pump 3;

f. a substitution solution being injected into the pipe in the well to expel the bock-removing agent solution therein into the oil layer after all the bock-removing agent solution has been injected into the pipe in the well, closing the well to make the bock-removing agent solution reaction in the well to realize the block-removing.

According to the present invention, the main materials mean chlorates and/or chlorites, such as sodium chlorite.

For ordinary oil (water) wells, the period of closing is usually 24 hours. After that, the block-removing agent solution should be expelled out. After the expulsion of the block-removing agent solution, the well can start to work normally again.

According to the method of the present invention, the danger of explosion and the harm to human bodies due to the leak of chlorine dioxide can be avoided since the chlorine dioxide is prepared in the well. In the meantime, the corrosion caused by chlorine dioxide of equipment and pipes is greatly decreased. The corrosion speed of chlorine dioxide to equipments and pipes is less than 15 mg/m$^2\cdot$h.

EXAMPLE

The oil well No. F26-6 in Shengli Oil Field was an oil well with lower permeability. It was blocked. After being blocked, the normal acidification block-removing method was used to remove the blocking several times. However, there were not any effects using the normal acidification block-removing method. Therefore, this well had been closed for one year and four months. Engineers in the working field think that, although there were some inorganic salts, the blocking was mainly caused by the polyacrylamides and microorganisms that accumulated at the area close to the bottom of the well. It was decided to remove the blockings by combining the normal acidification block-removing method with the method of the present invention. The inorganic salt blocking was removed by choric acid and hydrofluoric acid, and the polymer and microorganism blockings were removed by the method of the present invention. Based on the evaluation data made in a laboratory, it was considered that the concentration of chlorine dioxide block-removing agent in the well should be in the range of 100 mg/L-1200 mg/L. According to the reaction equations (1) and (2), the quantity of sodium chlorite and the quantity of phosphoric acid were calculated out.

According to the thickness of the oil layer, the porosity and the radius of the block-removing, it had been calculated that, to remove the blockings of the oil well No. F26-6, 15 m$^3$ aqueous solution of hydrofluoric acid was needed to remove the inorganic salts block. And, 15 m$^3$ of the block-removing agent aqueous solution of the present invention was needed to remove the polymer and microorganism block. For the preparation of the block-removing agent aqueous solution of the present invention, the solution of the main material (sodium chlorite) was made by dissolving 30 kg of sodium chlorite in 1 m$^3$ water. The amount of the adjuvant material (in view of phosphoric acid) was controlled by the flow meter at a rate of 20 kg phosphoric acid per 1 m$^3$ of the solution of the main material. The main material and the adjuvant material were injected in the well continuously.

On Jul. 10, 1999, the method of the present invention was carried out on the oil well No. F26-6 to realize the block-removing. Afterwards, the oil output of the well F26-6 was increased from 0 to 405 kg per day. Within one year, the accumulated oil output was 1011 tons. The effects of block-removing are shown in the following table.

| Block-removing result of the oil well No. F26-6 | | | | |
|---|---|---|---|---|
| Year | Month | Moving Liquid Level | The output of oil (ton) | Water content | Remark |
| 1998 | February | 2096 | 0.5 | 0.5 | |
| | March | 230 (static liquid level) | | 0.5 | Occasional closed |
| | April | | | | Occasional closed during April to June |
| | June | 1870 | 4 | | Pump checking Closed during 98.7–99.6. The highest level of static liquid was 210 meters |
| 1999 | June | | | | 40 m$^3$ sand was expelled, 3 broken oil pipes and 3356 scraped pipes were picked up using the block-removing agent in the present invention during the 7$^{th}$–10$^{th}$. Pump: 44/2099$_o$ |
| | July | 2029 | 4.5 | 0.5 | Pump: 44/2099 |
| | August | 1958 | 3.5 | 0.5 | |

-continued

Block-removing result of the oil well No. F26-6

| Year | Month | Moving Liquid Level | The output of oil (ton) | Water content | Remark |
|---|---|---|---|---|---|
| | September | 2010 | 3.1 | 0.5 | |
| | October | 372 (static liquid level) | 2.4 | 0.5 | The oil was flushed with 30 m³ water. One oil pipe was broken and was repaired. Pump: 44/2074 |
| | November | 1971 | 2.8 | 0.5 | |
| | December | 2028 | 2.1 | 0.5 | |
| 2000 | January | 2001 | 2.3 | 0.5 | |
| | February | 1768 | 2.6 | 0.5 | |
| | March | 1845 | 3.6 | 0.5 | |
| | April | 2033 | 3.5 | 0.5 | During the 5th–11th, the pumps were checked and repaired. |
| | May | 2068 | 3.3 | 0.5 | |

Remark: the above information is provided by Shengli oil field.

According to the present invention, when the main reagent aqueous solution and the adjuvant reagent aqueous solution are injected into a well, a sufficient concentration of the chlorine dioxide is formed based on the predetermined quantity, without the disadvantages of leaking gas, explosion or damage to people, and with the advantages of simple application and safety. Because the quantity of produced chlorine dioxide can be controlled, and in a fixed time, the chlorine dioxide is released continuously. Therefore, the ratio of removing blocks increases and the corrosion caused by chlorine dioxide of equipment and pipes decreases.

What is claimed is:

1. A method for preparing chlorine dioxide block-removing agent in wells, comprising:
   a. providing a tank (1), adding one or more selected from the group consisting of chlorate and chlorite, and water into the tank (1) to make them dissolve thoroughly in the tank (1);
   b. providing a tank (2), adding an acidic substances, which can be dissolved in water and produce hydrogen ion in an aqueous solution, and water into the tank (2) to make them dissolve thoroughly in the tank (2);
   c. providing a high pressure injection pump (3) which is provided with a water-feeding pipe (4) and a water-outgoing pipe (5), the said water-feeding water pipe (4) being directly connected with the tank (1), and connected with the tank (2) through a pressure pump (7) provided on the tank (2);
   d. initiating the high pressure injection pump (3) and the pressure pump (7), making the solution in the tank (1) and the solution in the tank (2) enter into the high pressure injection pump (3) via the water-feeding pipe (4) and being pressured in the pump (3), wherein the mixed solution enters the well (6) via the water-outgoing pipe (5) of high pressure injection pump (3), and wherein the chlorine dioxide block-removing agent is synthesized in the well by the reaction between the one ore more selected from the group consisting of chlorate and chlorite and the acidic substance.

2. The method according to claim 1, wherein, the concentration of the aqueous solution of said chlorine dioxide block-removing agent synthesized in the well is controlled in the range of about 200 mg/L to 5000 mg/L.

3. The method according to claim 1, wherein, the mixing of the one or more selected from the group consisting of chlorate and chlorite aqueous solution and the acidic substance aqueous solution can be carried out at any position of the water-feeding pipe (4) of the high pressure injection pump (3).

4. The method according to claim 1, wherein, the said chlorate is selected from the group consisting of the chlorates of mono-valence and bi-valence metal cations, and the said chlorite is selected from the group consisting of the chlorites of mono-valence and bi-valence metal cations.

5. The method according to claim 4, wherein, the said chlorate is sodium chlorate and potassium chlorate, and wherein the said chlorite is one or more selected from the group consisting of sodium chlorite and potassium chlorite.

6. The method according to claim 1, wherein, the said acidic substance is selected from the group consisting of the monoacids, biatomic acids and ternary acids which can be dissolved in water and can produce hydrogen ion, and the acid inorganic and organic salts which can be dissolved in water and can produce hydrogen ion.

7. The method according to claim 6, wherein, the said monoacid is selected from the group consisting of hydrochloric acid, hydrofluoric acid, sulfamic acid, formic acid, lactic acid and acetic acid; the said biatomic acid is selected from the group consisting of oxalic acid and tartaric acid; the said ternary acid is selected from the group consisting of phosphoric acid and citric acid; the said acid salt is selected from the group consisting of acid sulfate, acid phosphate, acid carbonate and acid tartrate.

8. The method according to claim 7, wherein, the acid is phosphoric acid, and the acid salt is bi-sodium phosphate, sodium phosphate or sodium tartrate.

9. The method according to claim 1, wherein, the tank (2) further contains an expansion-preventing agent.

10. The method according to claim 9, wherein, the expansion-preventing agent is potassium chloride or ammonia chloride.

11. The method according to claim 1, wherein, the tank (2) further contains a corrosion inhibitor.

12. The method according to claim 11, wherein, the corrosion inhibitor is tri-sodium phosphate, sodium hydroxide or sodium tripolyphosphate.

* * * * *